United States Patent [19]
Mankarious

[11] Patent Number: 5,906,121
[45] Date of Patent: May 25, 1999

[54] PEDAL LOCK ANTI-THEFT APPARATUS FOR VEHICLES

[76] Inventor: Adel H. Mankarious, 3235 Cocoplum Cir., Coconut Creek, Fla. 33063

[21] Appl. No.: 08/917,092

[22] Filed: Aug. 25, 1997

Related U.S. Application Data

[63] Continuation-in-part of application No. 08/705,328, Aug. 29, 1996, abandoned.

[51] Int. Cl.$^6$ .................................................. B60R 25/08
[52] U.S. Cl. .................................. 70/199; 70/202; 70/238
[58] Field of Search .............................. 70/198–203, 209, 70/211, 212, 237, 238, 254

[56] References Cited

U.S. PATENT DOCUMENTS

| | | | |
|---|---|---|---|
| 1,442,203 | 1/1923 | Williams et al. | 70/202 |
| 1,516,482 | 11/1924 | Gray | 70/202 |
| 2,812,669 | 11/1957 | Reff | 70/202 |
| 3,898,823 | 8/1975 | Ludeman | 70/200 |
| 4,471,852 | 9/1984 | Schield et al. | 180/287 |
| 4,632,209 | 12/1986 | Russell | 180/287 |
| 4,747,465 | 5/1988 | Hodgson | 180/287 |
| 4,779,435 | 10/1988 | Farrow | 70/200 X |
| 4,876,865 | 10/1989 | Trinidad et al. | 70/237 X |
| 5,040,387 | 8/1991 | Knott, Jr. | 70/202 |
| 5,094,092 | 3/1992 | Hsieh | 70/199 |
| 5,267,458 | 12/1993 | Heh | 70/202 X |
| 5,282,373 | 2/1994 | Riccitelli | 70/202 X |
| 5,345,796 | 9/1994 | Chieh et al. | 70/202 |
| 5,482,136 | 1/1996 | Sorkin | 180/287 |
| 5,537,846 | 7/1996 | Simon | 70/202 |
| 5,704,233 | 1/1998 | Forshad | 70/238 |
| 5,713,539 | 2/1998 | Russ et al. | 70/200 X |

FOREIGN PATENT DOCUMENTS

| | | | |
|---|---|---|---|
| 404709 | 12/1990 | European Pat. Off. | 70/202 |
| 2419846 | 11/1979 | France | 70/202 |
| 2681823 | 4/1993 | France | 70/202 |
| 2255060 | 10/1992 | United Kingdom | 70/202 |

*Primary Examiner*—Lloyd A. Gall
*Attorney, Agent, or Firm*—Oltman, Flynn & Kubler

[57] ABSTRACT

An anti-theft apparatus for a vehicle having a vehicle floor, a vehicle fire wall, an accelerator pedal, and a brake pedal mounted on a downwardly extending brake pedal lever, includes a cradle for fitting around the brake lever and including structure for retaining the brake pedal against substantial lateral and downward movement relative to the cradle, a bracing portion connected to the cradle and including a leg and a foot mounted to extend downwardly relative to the cradle to abut the vehicle floor for preventing removal of the cradle from the brake lever and brake pedal, and for preventing depression of the brake pedal and brake lever to operate the vehicle by bracing the cradle against substantial movement relative to the fire wall and floor, and a lock mechanism for releasably securing the leg at the given extension relative to the cradle that the foot abuts the vehicle floor. The cradle bottom wall is preferably concavely arched to follow and receive a forwardly curved brake lever. The cradle may alternatively be fitted onto a clutch pedal and lever to prevent operation of a vehicle clutch.

18 Claims, 10 Drawing Sheets

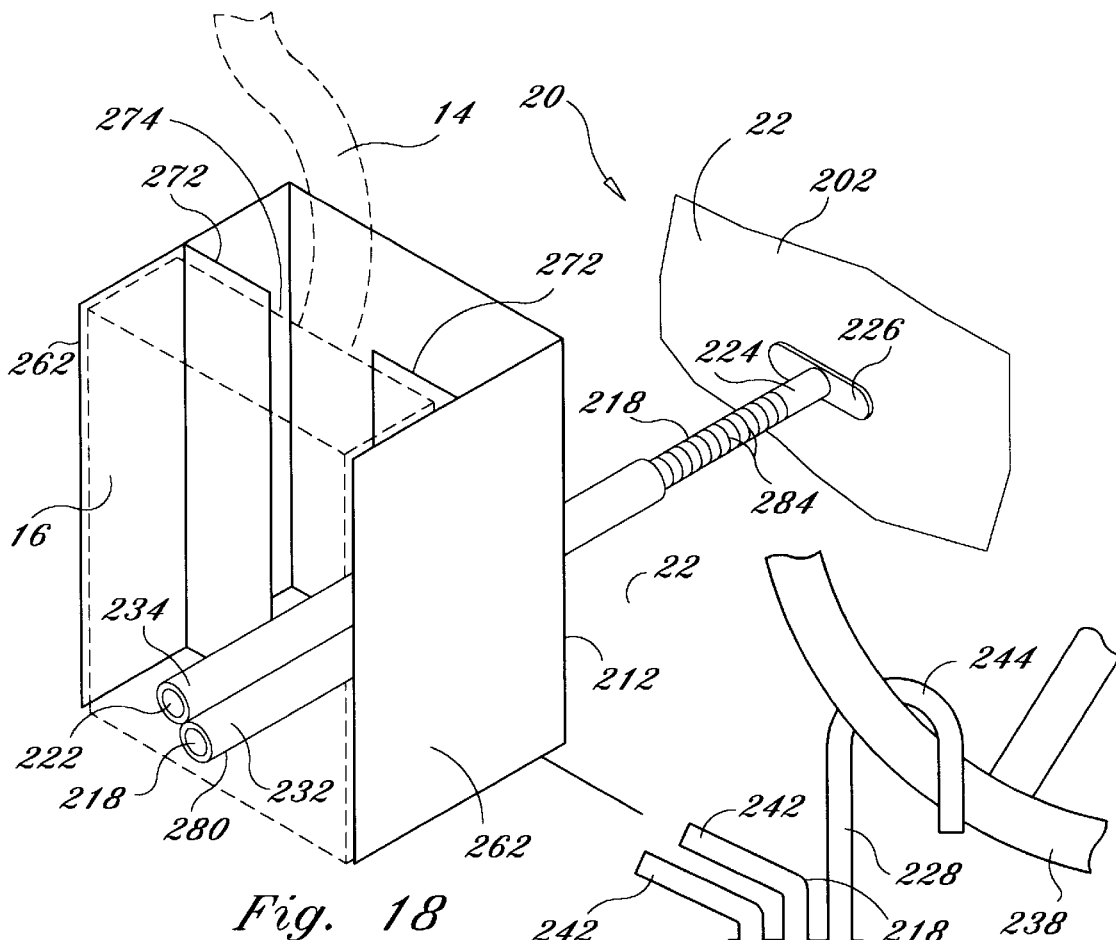
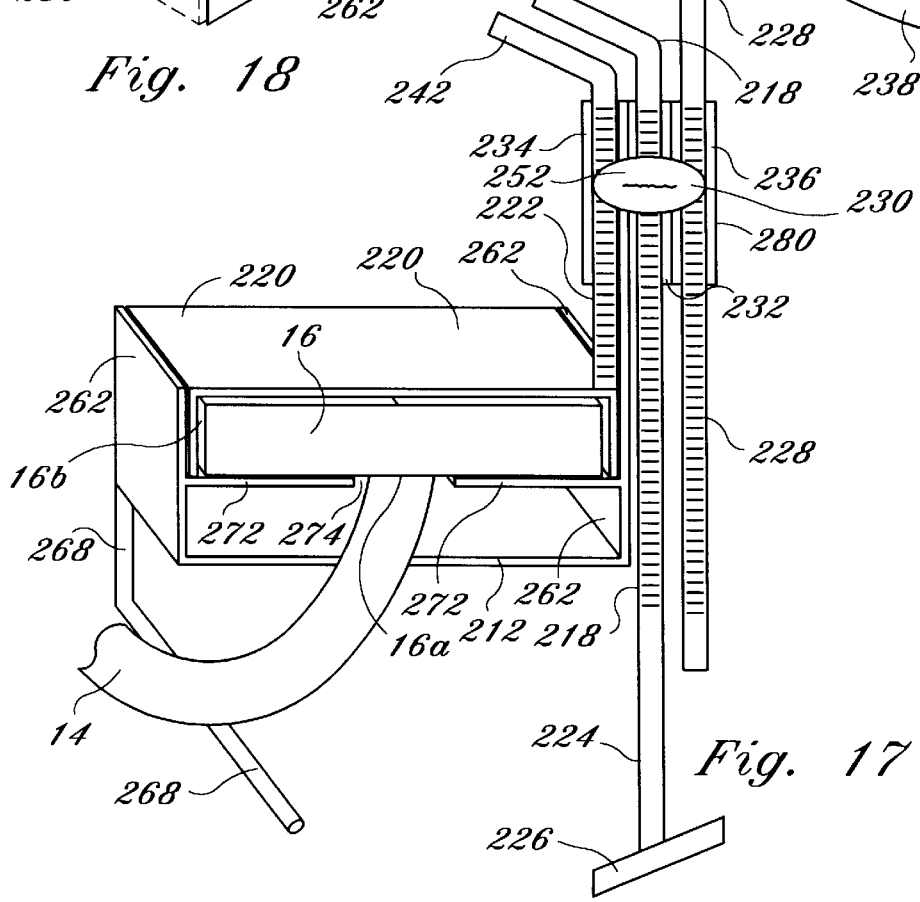

PEDAL LOCK ANTI-THEFT APPARATUS FOR VEHICLES

FILING HISTORY

This application is a continuation-in-part of application Ser. No. 08/705,328, filed on Aug. 29, 1996, now abandoned.

BACKGROUND OF THE INVENTION

1. Field of the Invention

The present invention relates generally to the field of devices for preventing theft of vehicles. More specifically the present invention relates to an apparatus for preventing operation of the vehicle brake so that a thief cannot drive the vehicle.

The apparatus includes a cradle for retaining one or both of a downwardly extending vehicle brake pedal and brake lever and having a telescoping leg connected to the cradle which is extended either downwardly or forwardly toward the fire wall to firmly abut the vehicle floor and means for releasably locking the leg against movement relative to the cradle. Extension of the locking leg to the floor prevents depression of the brake pedal.

The apparatus preferably retains the brake pedal or lever in one of two ways. One preferred way is for abutment of the leg against the floor to hold the cradle engagingly around the brake pedal or lever to both prevent displacement of the cradle from its engaging position and to brace and wedge the apparatus in theft-preventing engagement. The other preferred way is to slide an enclosing member against the brake pedal or lever while the pedal or lever is retained within the cradle to secure the pedal or lever against removal from the cradle, and by extending the leg to the floor to brace the apparatus and prevent brake pedal depression.

The lock mechanism for releasably securing the leg at the given extension is released with a key or equivalent element to permit retraction of the leg for apparatus removal. For the second embodiment, the lock mechanism also secures the enclosing member in its holding position against the pedal or lever. The lock mechanism further optionally secures an extensible hook member which is engagingly fitted around the vehicle steering wheel to both further anchor the apparatus and to prevent steering wheel rotation. The cradle may alternatively be fitted onto the clutch pedal to prevent operation of the clutch Another optional feature, illustrated for the first embodiment, is a laterally extensible accelerator cover plate slidably retained within a cover plate sheath secured to the cradle. This feature doubles the protection against vehicle theft, because access is blocked to both the brake and accelerator pedals.

Still another optional feature for vehicles with clutches is a laterally extensible leg sheath and cradle fanning structure, which is secured to the cradle opposite the accelerator cover plate. After mounting the cradle onto the brake lever and pedal, the fanning structure is expanded to the left so that the leg sheath swings behind the clutch pedal, thereby obstructing clutch operation. Parts of the apparatus are preferably made of case hardened steel and stainless steel.

2. Description of the Prior Art

There have long been devices for preventing theft of various types of vehicles. Most of these devices have been designed for automobiles, because they are the most frequently stolen vehicle. Yet these prior devices have generally required unsightly alteration of the vehicle, have been difficult and awkward to install, or have been readily circumvented and removed by thieves.

One such prior device is that of Hodgson, U.S. Pat. No. 4,747,465, issued on May 31, 1988. Hodgson discloses a device for preventing access to the vehicle operating pedals, including the brake, accelerator and clutch pedals. A steel plate is pivotally connected to the vehicle floor in front of the pedals with a hinge, to pivot up and over all two or three pedals at once. A latch arm pivotally extends from the plate driver side face to fit over a U-shaped metal loop anchored to the vehicle floor. A pad lock is inserted into the loop to lock the latch arm onto the loop and thereby lock the steel plate in position blocking the pedals A problem with Hodgson is that the steel plate hinge and the loop must both be fastened to the vehicle floor, requiring skilled labor and permanently marring the appearance of the automobile.

Russell, U.S. Pat. N. 4,632,209, issued on Dec. 30, 1986, reveals an anti-theft device for automobiles. Russell is much like Hodgson, in that a steel plate is hingedly connected to the vehicle floor in front of the pedals to pivot upwardly and obstruct access to the pedals. A latch arm extends from the plate to a metal loop anchored to part of the automobile, and a pad lock secures the latch arm and steel plate in the obstructing position. The problems of Hodgson are again presented.

Hsieh, U.S. Pat. No 5,094,092, issued on Mar. 10 1992, teaches an auto vehicle pedal lock. The Hsieh device consists of an elongate plate having an outwardly opening U-shaped pedal lever receiving structure at each end, and a downward U-shaped curvature in its middle-section. The U-shaped end structures are designed to fit around clutch and accelerator pedal levers, while the downward U-shaped curvature receives the brake lever. A problem with Hsieh is that all three pedal levers must have the highly unusual, horizontally protruding shape shown in the Hsieh Figures to be potentially capable of receiving the device. Another problem is that if one U-shaped end is fitted onto the clutch or accelerator lever, pivoting the plate to complete mounting can only cause the other U-shaped end structure to abut rather than to receive the remaining accelerator or clutch lever.

Sorkin, U.S. Pat. No. 5,482,136, issued on Jan. 9, 1996, discloses an anti-theft gas pedal lock. Sorkin is similar to Hsieh in that it is designed to fit an unusual horizontally extending accelerator pedal. Sorkin consists of a lever collar structure for releasably encircling the accelerator lever and a pedestal structure connected to the collar and secured to the vehicle floor. A problem with Sorkin is that it would not fit most accelerator levers. Another problem is that the device would have to be permanently fastened to the floor if it is to stop movement of the pedal, so that the floor would have to be permanently marred.

Schield, et al., U.S. Pat. No. 4,471,852, issued on Sep. 18, 1984, reveals an anti-theft device for automotive vehicles. Schield, et al., includes a lockable member that, when activated while the brakes have been applied by the driver, inhibits any substantial change in the then existing fluid pressure condition in the brake fluid pressure system of the vehicle. The device also optionally includes a lockable brake lever engaging member for immobilizing the brake pedal to prevent the pedal from being depressed The brake lever engaging member includes a rectilinear rack with teeth along one longitudinal face and a lever hook at its upper end for hooking around the accelerator lever. A pedal brace slides up the rack to abut the lower face of the pedal. A problem with the Schield, et al. brake pedal engaging member is that the rack must be of just the right length for the particular vehicle, to simultaneously hook around the lever and abut the vehicle floor. There is no universal fit. If the rack is too long, the hook end will not engage the brake lever, and if the rack is too short, it will not abut the floor and the pedal therefore can be depressed and operated. Another problem is that brake lever is engaged at only one point along its length, presenting the possibility of a thief being able to work the device off the lever.

It is thus an object of the present invention to provide a brake lever engaging vehicle anti-theft apparatus which fits virtually any automobile or truck It is another object of the present invention to provide such an apparatus which engages the brake lever at a sufficient number of points to prevent a thief from working the apparatus loose.

It is still another object of the present invention to provide such an apparatus which optionally additionally covers the accelerator pedal, optionally extends behind and blocks the clutch pedal, or optionally engages the steering wheel, for enhanced security.

It is finally an object of the present invention to provide such an apparatus which is relatively easy to install and remove, does not require modification of or marring fastening to the vehicle, and which is sturdy and inexpensive to manufacture.

SUMMARY OF THE INVENTION

The present invention accomplishes the above-stated objectives, as well as others, as may be determined by a fair reading and interpretation of the entire specification.

An anti-theft apparatus is provided for a vehicle having a vehicle floor, an accelerator pedal, and a pivoting brake control including a brake pedal mounted on a downwardly extending brake lever, including an engaging structure for mechanically engaging the pivoting brake control; a bracing structure connected to the engaging structure having a leg which is extensible to the vehicle floor to prevent the brake control from pivoting substantially, and is retractable from the vehicle floor to permit pivoting of the brake pedal, the leg being functionally separate from and slidable relative to the engaging structure; and a locking structure for releasibly securing the leg against movement relative to the engaging structure when the leg is extended The engaging structure preferably includes a cradle for retaining the brake pedal The apparatus preferably further includes an enclosing member attached to an enclosing member guide rod slidably retained within an enclosing member guide tube connected to the leg guide tube; where the enclosing member is slidably extendable toward the brake pedal while the pedal is retained within the cradle to secure the pedal against removal from the cradle. The leg is preferably a segment of a leg guide rod slidably retained within a leg guide tube.

The leg guide rod and the enclosing member guide rod both extend a certain distance out of the guide tubes away from the vehicle floor and terminate in handle portions for gripping by a user to slide the leg guide rod and enclosing member guide rod within the guide tubes to engage and disengage the apparatus from the pivoting brake control.

The apparatus preferably additionally includes a hook guide rod having a steering wheel engaging hook segment formed on an engaging end of the hook guide rod, and a hook guide tube connected to the leg and enclosing member guide tubes, where the hook guide rod is slidably retained within the hook guide tube. The brake pedal has a back face and side faces, and the cradle preferably wraps around the back face and side faces of the brake pedal. The enclosing member is preferably a segment of channel stock mounted substantially perpendicularly on the enclosing member guide rod.

The leg guide rod and the enclosing member guide rod each preferably have a longitudinal series of locking notches. The locking structure preferably includes a bolt port in each of the leg and enclosing member and hook guide tubes, and a retractable bolt extensible into each of the bolt ports to engage an immediately adjacent locking notch in each of the leg, enclosing member and hook rods, and thereby locking the rods against substantial longitudinal movement relative to the guide tubes, and lock mechanism and a key for extending and retracting the bolt.

The rod and engaging member guide tubes constitute an apparatus body, where the cradle is a segment of channel stock fastened to the guide body to extend substantially perpendicularly from the guide body, and where the channel stock cradle side walls of the cradle are positioned along upright cradle side edges, and have brake lever passing openings to pass laterally extending brake levers. The apparatus optionally includes two generally horizontal cradle side walls for further securing the brake pedal within the cradle.

The cradle optionally includes a segment of channel stock which is deeper than the brake pedal is thick, the channel stock including a channel web and channel side walls; brake pedal abutment flanges extending toward each other from opposing channel side walls and defining between them a brake lever passing gap and being spaced apart from the channel web, so that the abutment flanges stabilize the brake pedal by making substantially flat abutment against the pedal, while the brake lever extends through the gap and out of the cradle, to accommodate a wide variety of brake pedal and brake lever configurations. The engaging structure preferably engages the brake pedal.

Where the vehicle includes a pivoting clutch control including a clutch pedal mounted on a downwardly extending clutch lever, the engaging structure optionally engages the pivoting clutch control.

An anti-theft apparatus is further provided for a vehicle having a vehicle floor, a vehicle fire wall, an accelerator pedal, and a brake pedal mounted on a downwardly extending brake pedal lever, the apparatus including a cradle for fitting around the brake lever and including structure for retaining the brake pedal against substantial lateral and downward movement relative to the cradle, a bracing portion connected to the cradle and including a leg and a foot mounted to extend downwardly relative to the cradle to abut the vehicle floor for preventing removal of the cradle from the brake lever and brake pedal, and for preventing depression of the brake pedal and brake lever to operate the vehicle by bracing the cradle against substantial movement relative to the fire wall and floor; and a lock mechanism for releasably securing the leg at the given extension relative to the cradle that the foot abuts the vehicle floor.

The cradle preferably includes a channel structure having two substantially parallel and mutually opposing channel structure side walls and a channel structure bottom wall interconnecting the channel structure side walls and channel structure upper and lower ends; the channel structure side walls being spaced apart a distance to receive between them the brake pedal lever. The cradle bottom wall is preferably concavely arched to follow and receive a forwardly curved brake lever, so that the brake lever is received in the cradle to a depth that the brake pedal abuts the cradle side walls. The apparatus preferably additionally includes a U-shaped brake pedal retaining structure extending from and doubling back over the channel structure to receive the brake pedal as the brake lever slides into the channel structure. The apparatus preferably further additionally includes a brake pedal retaining bracket including a bracket member extending from the channel structure, and further extending across and spaced outwardly from the channel structure, so that the brake lever is received between the bracket member and the channel structure and the bracket member abuts the brake lever to obstruct movement of the channel structure toward the vehicle fire wall, and preferably additionally includes an apparatus guide flange extending from the perimeter of the cradle and the retaining structure for abutting the vehicle floor and helping to guide the cradle into and out of place around the brake pedal lever.

The apparatus preferably additionally includes a channel extension structure for orienting the channel structure to receive a substantially rectilinear and vertical brake lever, the channel extension structure including two opposing and tapering extension side walls at the channel structure lower end, where the extension side walls are laterally spaced apart from each other a sufficient distance to receive between them the brake lever.

The apparatus preferably further includes a leg sheath for slidably receiving the leg, the leg sheath including a tube member of substantially rectangular cross-section, where the leg has a corresponding sized and proportioned substantially rectangular cross-section and a longitudinal edge, and where the leg includes a series of notches recessed along the longitudinal edge. The lock mechanism preferably includes a key operated lock structure having a locking catch for sliding into any immediately adjacent leg notch to lock the leg against retraction into the leg sheath until the locking catch is moved and the adjacent leg notch released by inserting a key into and operating the lock structure.

The apparatus optionally additionally includes a laterally extending accelerator cover plate structure for blocking access to the accelerator pedal. The cover plate structure preferably includes an accelerator cover plate sheath connected to the cradle and a laterally extensible cover plate slidably retained within the cover plate sheath for blocking access to the accelerator pedal and cover plate securing structure for releasably securing the cover plate against movement relative to the cover plate sheath. The accelerator cover plate sheath includes a forward sheath wall, a rearward sheath wall and a perimetical sheath wall interconnecting the forward and rearward sheath walls. The cover plate securing structure preferably includes a threaded set screw bore in the rearward sheath wall, a set screw fastened into the set screw bore, an adjustment track on the cover plate rear face, the adjustment track including a longitudinal series of set screw receiving holes, so that after the cover plate is extended from the cover plate sheath a suitable distance to cover the accelerator pedal and so that one of the screw receiving holes registers with the set screw bore, the set screw may be screwed fully through the set screw bore in the cover plate sheath and into the registering set screw receiving hole in the cover plate adjustment track, thereby retaining the cover plate against movement within the cover plate sheath.

Where the vehicle includes a clutch and a clutch pedal, the apparatus additionally preferably includes a laterally extensible leg sheath and cradle fanning structure pivotally interconnecting the leg sheath and the cradle for permitting lateral fanning of the leg sheath to a position behind the clutch pedal to obstruct depression of the clutch pedal. The fanning structure preferably includes a forward guide wall and a rearward guide wall, the guide walls being substantially mutually parallel, opposing and spaced apart from each other, an interior fanning plate having two fanning plate ends and a fanning plate rearward face and fitting closely and slidably between the forward and rearward guide walls, the fanning plate being pivotally connected to at least one of the guide walls at one fanning plate end with a fanning structure pin, a track on the fanning plate rearward face including a longitudinal series of screw receiving holes, and a threaded set screw bore in the rearward guide wall fitted with a set screw for screwing through the set screw bore and into any one of the series of screw receiving holes registering with the set screw bore to retain the fanning plate at a given extension relative to the guide walls.

An anti-theft apparatus is also provided for a vehicle having a vehicle floor, a vehicle fire wall, an accelerator pedal, and a clutch pedal mounted on a downwardly extending clutch pedal lever, the apparatus including a cradle for fitting around the clutch lever and including structure for retaining the clutch pedal against substantial lateral and downward movement relative to the cradle, a bracing portion connected to the cradle and including a leg and a foot mounted to extend downwardly relative to the cradle to abut the vehicle floor for preventing removal of the cradle from the clutch lever and clutch pedal, and for preventing depression of the clutch pedal and clutch lever to operate the vehicle by bracing the cradle against substantial movement relative to the fire wall and floor, and a lock mechanism for releasably securing the leg at the given extension relative to the cradle that the foot abuts the vehicle floor.

BRIEF DESCRIPTION OF THE DRAWINGS

Various other objects, advantages, and features of the invention will become apparent to those skilled in the art from the following discussion taken in conjunction with the following drawings, in which:

FIG. 17 is a view as in FIG. 11, except that the abutment flange version of the cradle is illustrated.

FIG. 18 is a perspective view of the cradle of FIG. 17 engaging a brake pedal and lever shown in broken lines and of the leg rod, leg and optional foot abutting the fire wall portion of the vehicle floor to brace the apparatus. The guide body is partially illustrated.

DETAILED DESCRIPTION OF THE PREFERRED EMBODIMENTS

Figure 1:
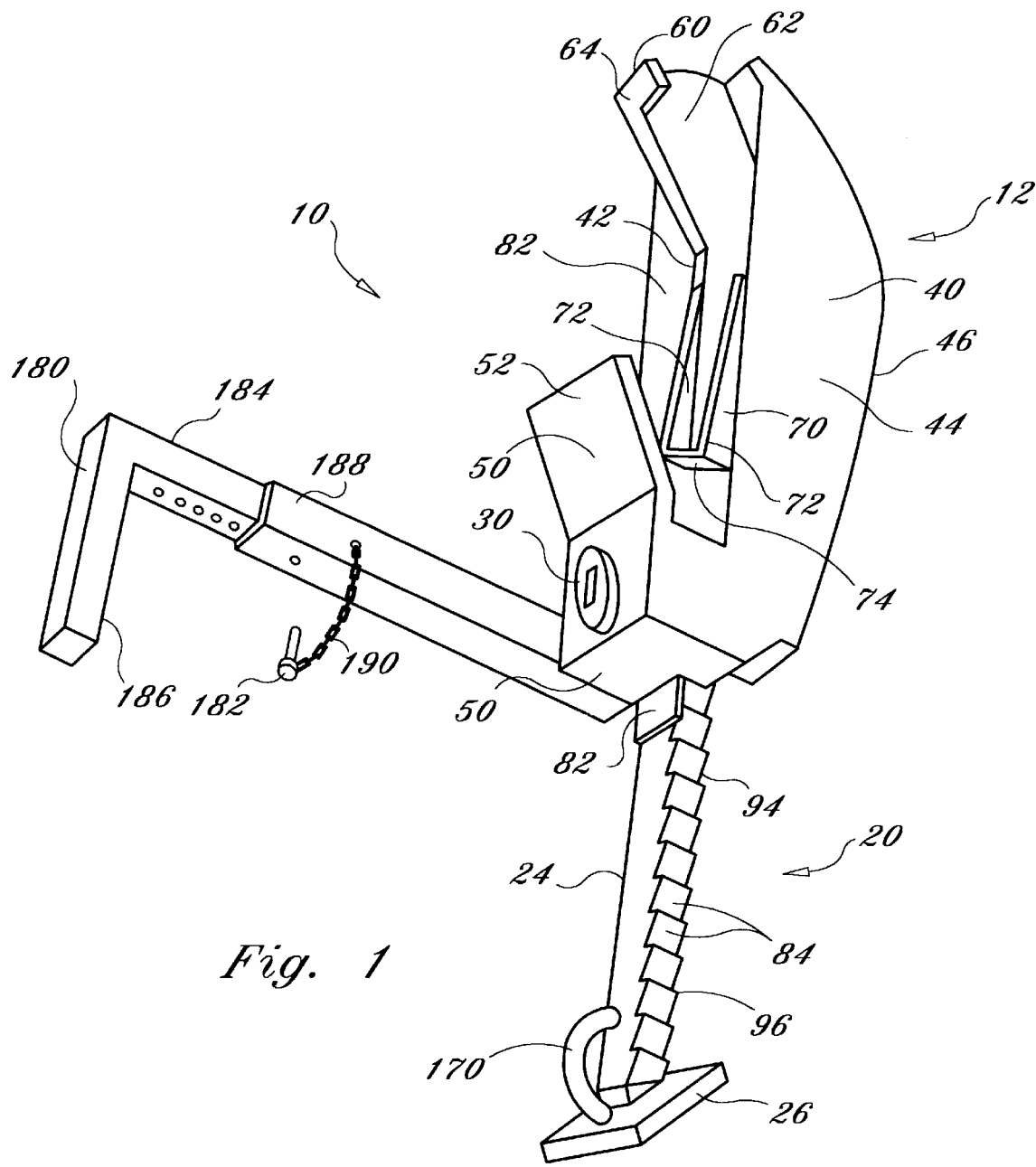
FIGS. 1 and 1a are perspective views of the basic preferred embodiment, shown with the leg extended

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure Reference is now made to the drawings, wherein like characteristics and features of the present invention shown in the various FIGURES are designated by the same reference numerals.

First Preferred Embodiment

Referring to FIGS. 1–10, a vehicle anti-theft apparatus 10 is disclosed having a cradle 12 for fitting around and retaining a downwardly extending vehicle brake lever 14 and brake pedal 160 Apparatus 10 also includes a telescoping locking bracing portion 20 connected to cradle 12, which is extended downwardly from cradle 12 to firmly abut the vehicle floor 22. See FIG. 1. Bracing portion 20 includes a locking leg 24 and optionally includes a substantially square plate foot 26 secured to the lower end of leg 24. Extension of the locking leg 24 and foot 26 to floor 22 prevents both depression of the brake pedal 16 and removal of cradle 12 from brake lever 14. See FIGS. 2–4. Abutment of the leg 24 and foot 26 against floor 22 braces and wedges apparatus 10 in its operative, theft preventing position. A lock mechanism 30 releasably secures leg 24 at the given extension to reach the floor 22 of the given vehicle. Lock mechanism 30 is released with a key (not shown) or with a remote control Cradle 12 preferably includes a channel structure 40 having two parallel side walls 42 and 44 and a bottom wall 46 interconnecting side walls 42 and 440 Side walls 42 and 44 are spaced apart a distance to closely receive between them a conventional brake lever 14, and bottom wall 46 is concavely arched to follow and receive the forwardly curved brake levers 14 found on most automobiles and trucks. Cradle 12 is also designed to receive rectilinear brake levers 14, as explained below. The brake lever 14 is received in cradle 12 to a depth that the brake pedal 16 abuts the channel structure 40 side wall 42 and 44 upper edges. See FIGS. 5 and 6. A U-shaped brake pedal 16 retaining structure 50 extends from the lower end of channel structure 40 and doubles back upwardly and over to receive brake pedal 16 as brake lever 14 slides fully into channel structure 400. A lever retaining projection 60 optionally includes a projection mounting wall 62 extending forwardly from the channel structure 40 upper end and a projection arm 64 extending across and spaced forwardly of the channel structure 40 to obstruct movement of cradle 12 toward the vehicle fire wall 66 by abutting brake lever 14. Retaining structure 50 and lock mechanism 30 are preferably structurally combined for compactness and mutual reinforcement.

To permit cradle 12 to receive straight vertical brake levers 14, a wedge-shaped channel wall extension 70 is preferably provided at the channel structure 40 lower end, including a pair of tapering extension side walls 72 and an extension end wall 74. The free end 52 of the retaining structure 50 is angled outwardly, so that the wedge-shaped channel wall extension 70 and retaining structure 50 are configured to receive and engage brake pedals 16 with either curved or straight brake levers 14.

Leg sheath 82 is preferably a tube of rectangular cross-section and leg 24 is a rectangular cross-section elongate rod, to prevent rotation of leg 24 relative to leg sheath 82. Many other cross-sectional shapes are contemplated for leg 24 and leg sheath 82, however, including circular, oval, triangular, and so forth. Leg 24 has a series of leg notches 84 along one longitudinal edge, and is sized to closely and slidably fit within leg sheath 82. Lock mechanism 30 is preferably a cylindrical key lock of known design similar to that used in the deluxe CLUB™ steering wheel locking device. Operation of lock mechanism 30 causes a locking catch (not shown) to slide into the immediately adjacent leg notch 84 with spring biasing means (not shown). The upper notch ends 94 are angled to permit the catch to slide out of one notch 84 and into the next in repeating sequence as leg 24 is slid out of leg sheath 82. Notch lower ends 96 are perpendicular to the leg 24 longitudinal axis to prevent the catch from sliding out of any of the notches 84 with attempted axial movement of the leg 24 into the leg sheath 82. The catch is retracted to permit movement of leg 24 into leg sheath 82 when a key is inserted into lock mechanism 30 and turned to withdraw the catch and thereby release leg 24 for retraction into leg sheath 82. The foot 26 is preferably a rigid square plate secured onto the lower end of the leg 24, such as by welding, and angled relative to leg 24 to make full face contact with a typical vehicle floor 22.

An optional additional feature is an apparatus guide flange 102 extending from the perimeter of cradle 12 and brake pedal 16 retaining structure 50. Flange 102 abuts vehicle floor 22 and helps guide cradle 12 into and out of place around brake lever 14.

Another optional feature is a laterally extensible accelerator cover plate 110 slidably retained within a cover plate sheath 112 secured to cradle 12. See FIGS. 7 and 8. This feature doubles the protection, so that access is blocked to both the brake and accelerator pedals 16 and 108, respectively. Cover plate sheath 112 includes a forward sheath wall 114 and a rearward sheath wall 116, and a perimetical sheath wall 118. Rearward sheath wall 116 includes a pair of threaded set screw bores 122, and cover plate 110 has secured to its rear face a pair of parallel adjustment tracks 124. Each adjustment track 124 includes a longitudinal series of set screw receiving holes 126, positioned to pass beneath one of the set screw bores 122, which are preferably not threaded. A set screw 132 is screwed into each set screw bore 122. Cover plate 110 is extended from the cover plate sheath 112 a suitable distance to cover accelerator pedal 108 of a particular vehicle and so that one of the screw receiving holes 126 in each track 124 registers with each bore 122. Set screws 132 are screwed fully through bores 122 in cover plate sheath 112 and into a pair of registering holes 126 in cover plate 110 retaining cover plate 110 against movement within cover plate sheath 112. Set screws 132 become inaccessible when apparatus 10 is installed in its locking mode because the cover plate 110 rear face is directed toward and close to the vehicle floor 22. In this way apparatus 10 is ready for all future deployments in the given vehicle. Cover plate 110 and cover plate sheath 112 are both preferably L-shaped for enhanced strength. See FIGS. 7 and 8.

Another optional feature for vehicles with clutch pedals (not shown) is a laterally extensible leg sheath 82 and cradle fanning structure 142. See FIGS. 9 and 10. After mounting the cradle 12 onto the brake lever 14 and pedal 16, the fanning structure 142 is extended to the left so that leg sheath 82 is positioned behind the clutch pedal. Then the leg 24 is extended until foot 26 abuts the floor 22 and thereby secures apparatus 10 in its operative position. Fanning structure 142 includes a pair of parallel and spaced apart guide walls 144 and 146, and an interior fanning plate 148 fitting closely between guide walls 144 and 146 and pivotally connected to guide walls 144 and 146 with a fanning structure pin 152. Pin 152 extends into opposing pin bores (not shown) in the inner faces of guide walls 144, and the pin bores either do not penetrate fully through the guide walls 144 and 146, or alternatively pin 152 is of a length to remain flush with the guide wall 144 outer surfaces, to prevent the removal of pin 152 by intruders. The rearward guide wall 146 includes a threaded set screw bore 154 and a set screw 156 which is received in any one of a series of screw receiving holes 158 in a track 162 on fanning plate 148 rearward face, similar to the set screw arrangement for the accelerator cover plate 110. Being directed toward and close to the vehicle floor 22, the fanning structure 142 set screw 156 is inaccessible when apparatus 10 is installed. Fanning structure 142 is similar in construction to cover plate sheath 112, except that fanning plate 148 pivots from between guide walls 144 and 146 from one end rather than sliding straight out of a sheath. Cradle 12 may alternatively fit around the clutch pedal.

Figure 1A:
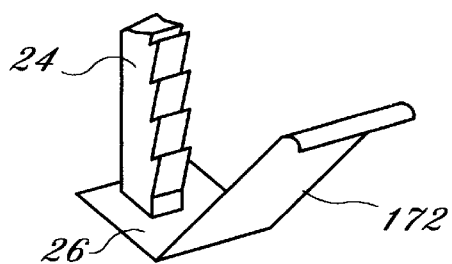
Figure 2:
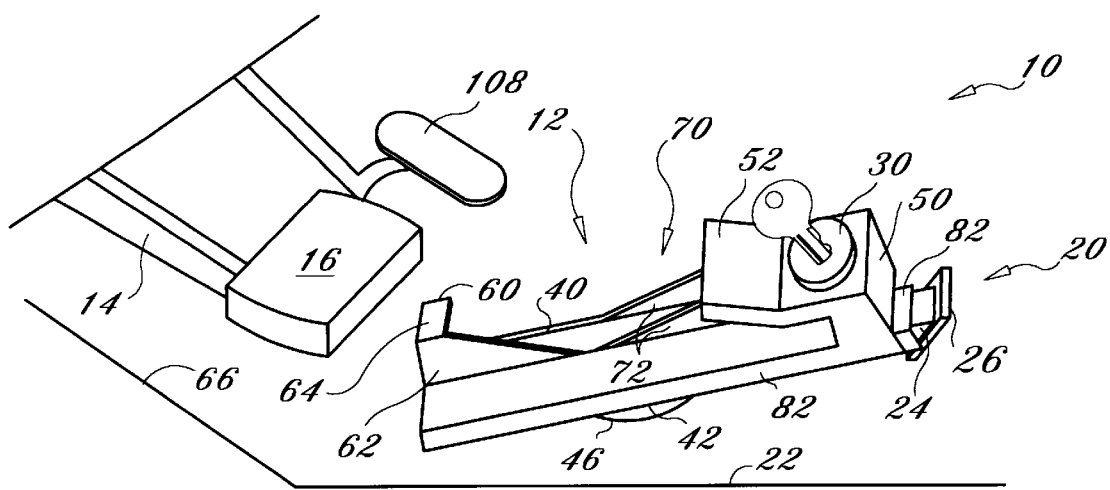
FIGS. 2–4 are a step by step series of perspective views of the apparatus of FIG. 1 being fitted into operational position on a brake lever and pedal.
Figure 3:
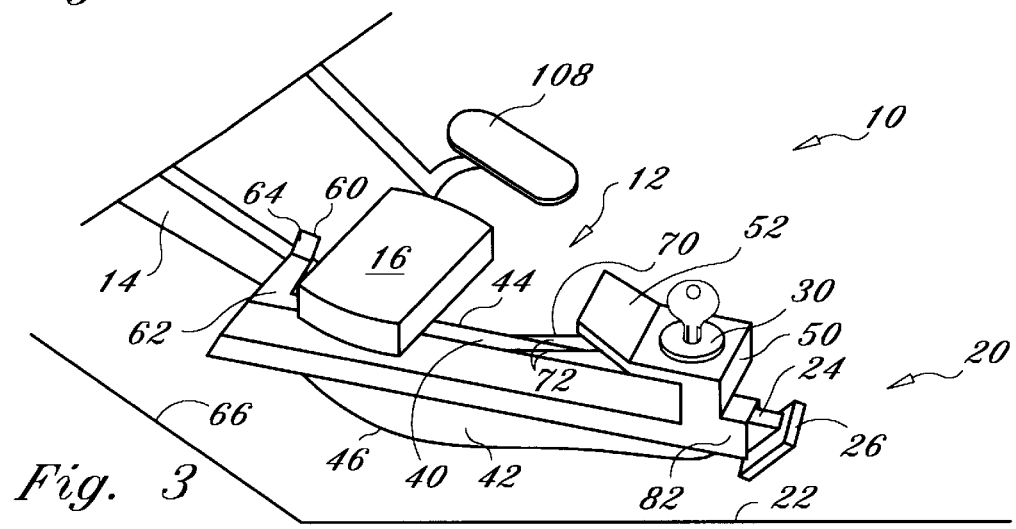
Figure 4:
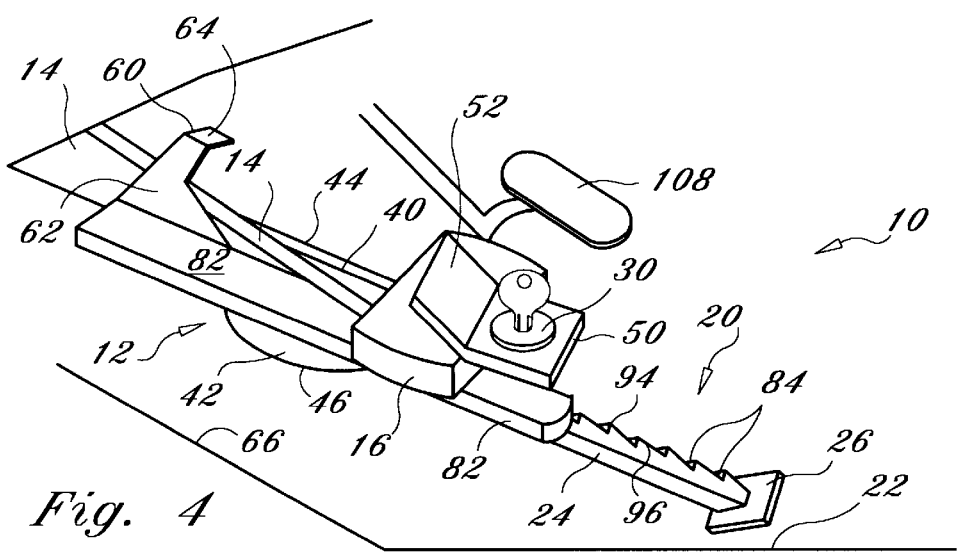
Figure 5:
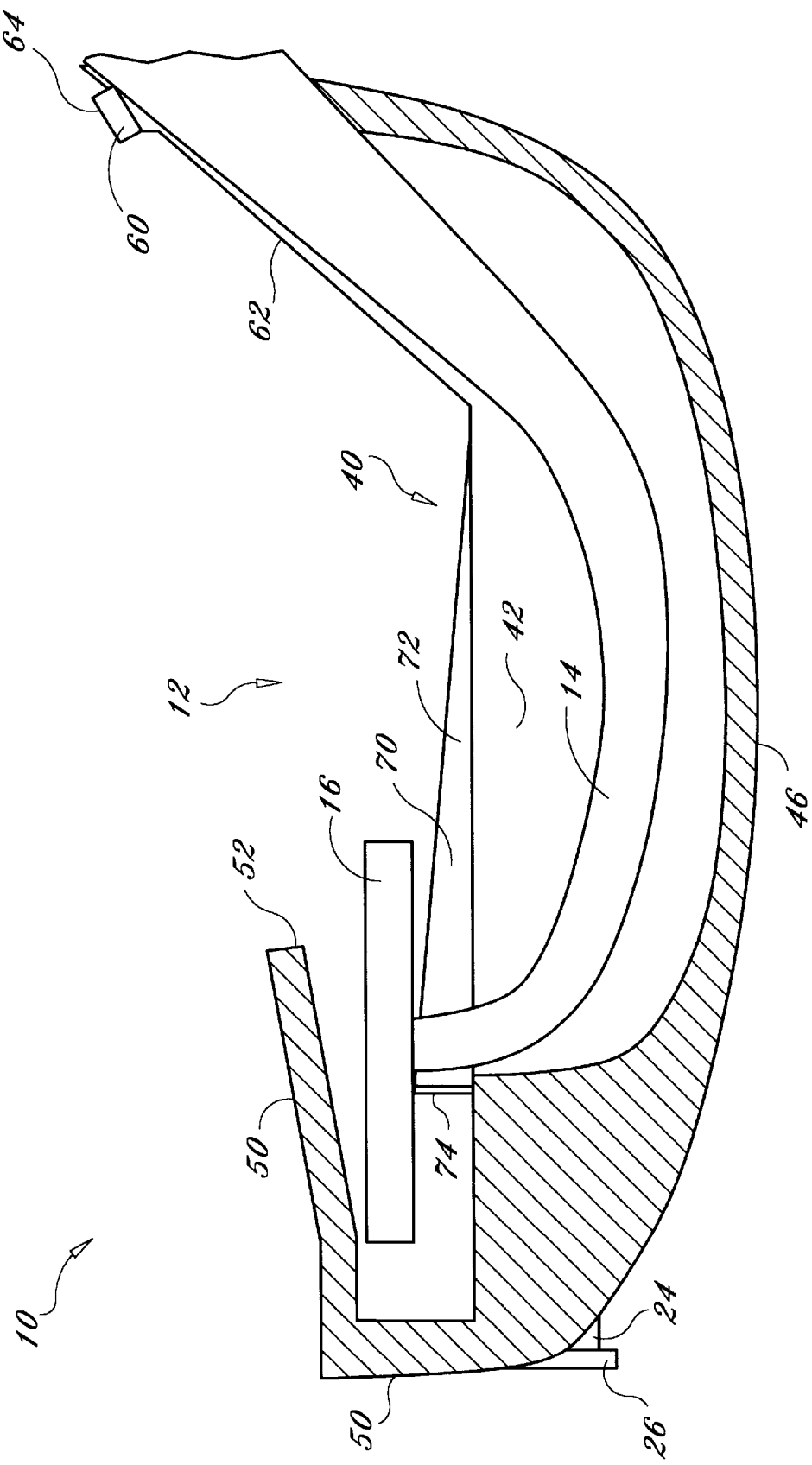
FIG. 5 is a cross-sectional view of the cradle fitted onto a typical curved brake lever.
Figure 6:
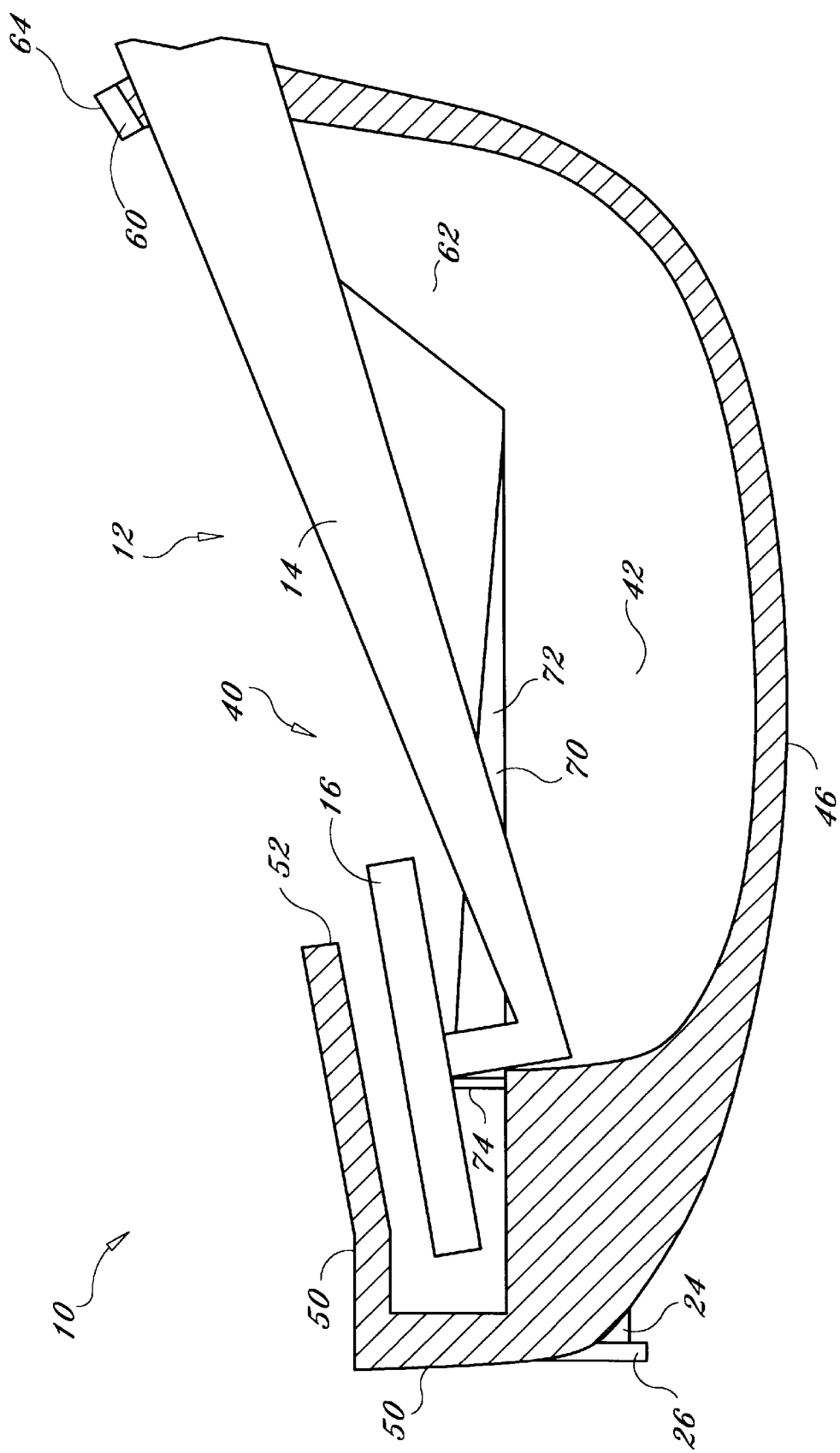
FIG. 6 is a view as in FIG. 5, except that the cradle is fitted onto a straight brake lever. Note how the wedge-shaped extension walls and upwardly tilted free end of the U-shaped projection equally accommodate either the two types of brake lever shapes.
Figure 7:
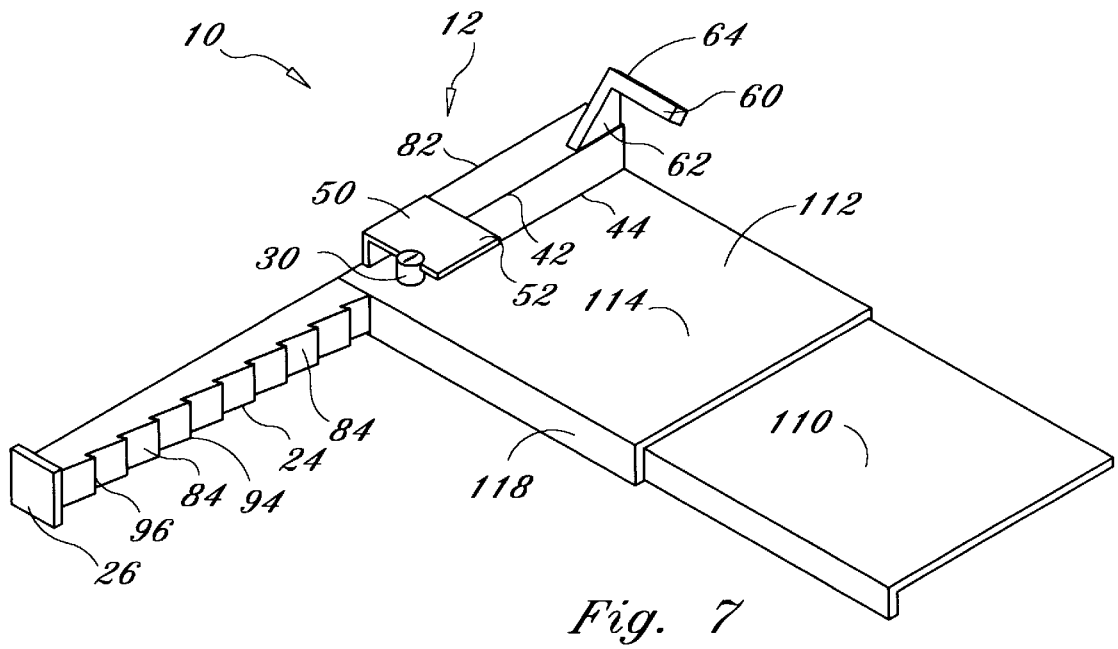
FIG. 7 is perspective top view of the apparatus including the preferred accelerator cover structure, shown here with the cover plate extended
Figure 8:
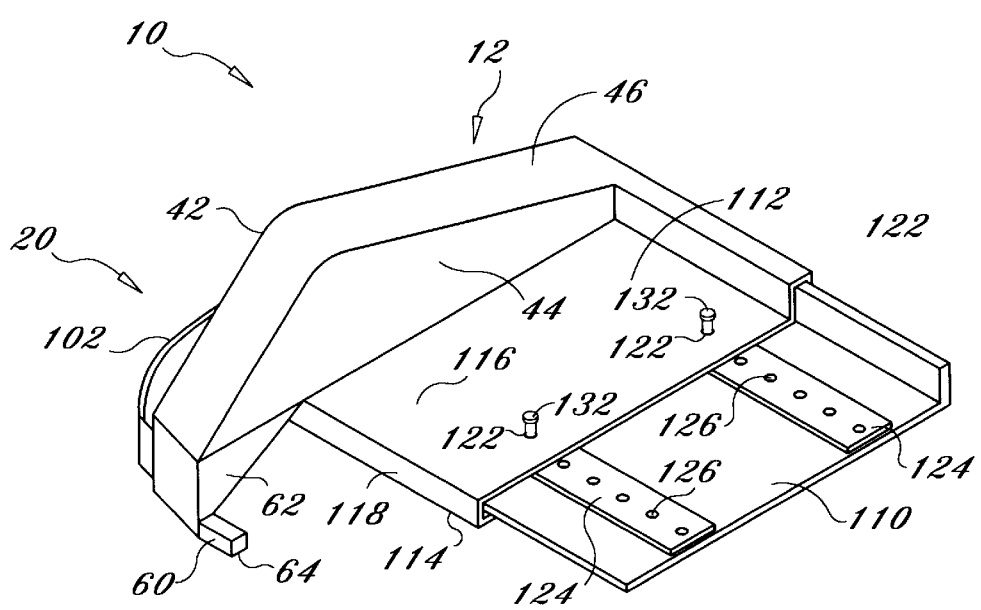
FIG. 8 is a perspective bottom view of the apparatus of FIG. 7, showing the cover plate securing set screw and track structure. The optional apparatus guide flange is also shown.
Figure 9:
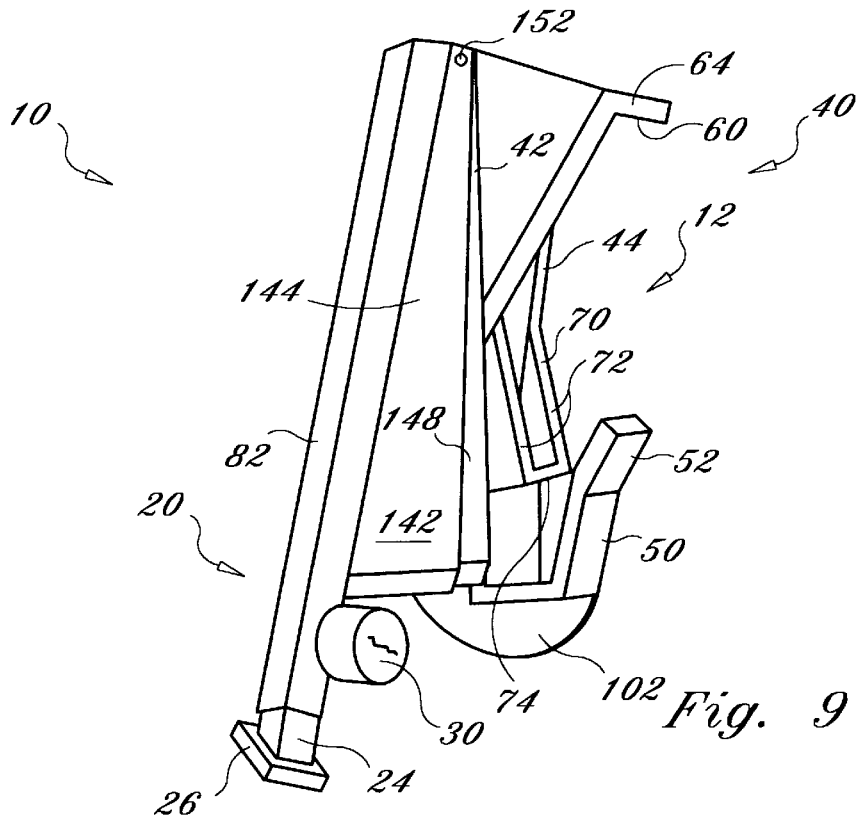
FIG. 9 is a perspective top view of the apparatus including the fanning structure.
Figure 10:
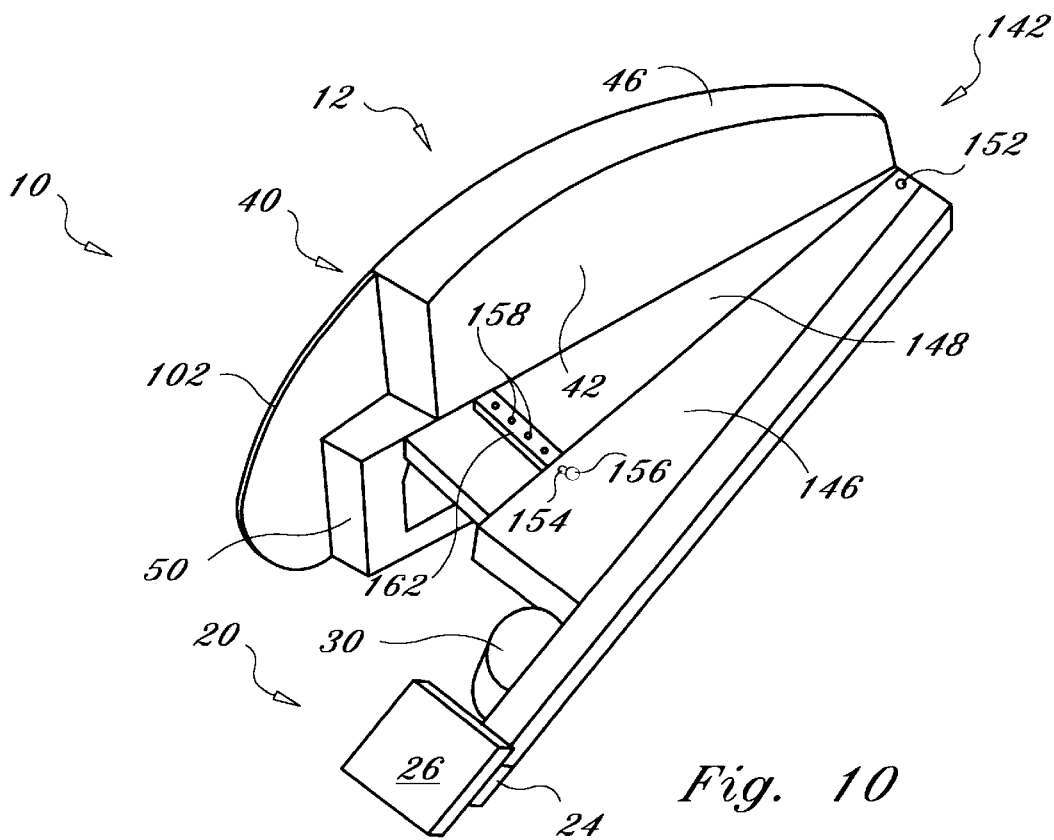
FIG. 10 is a perspective bottom view of the apparatus of FIG. 9, showing the fanning plate securing set screw and track structure. The apparatus guide flange is also shown.

Another preferred optional feature is a finger pull ring 170 extending from leg 24 adjacent to foot 26, for the user to grip when pulling leg 24 upwardly into leg sheath 82 for removal of apparatus 10 to permit use of the vehicle. See FIG. 1. An alternative to finger pull ring 170 is a foot lift tab portion 172 extending toward the user from foot 26 and having a hooked end for engagement by a user shoe when pulling leg 24 upwardly. See FIG. 1a. A telescoping user gripping handle structure 180 is preferably provided. Structure 180 includes a set pin 182 fitting through registering ports in an outer sleeve 188 welded to the channel structure 40 and in an internally sliding rod 184. Rod 184 has a bent handle portion 186. A pin retaining chain 190 is optionally provided. The weight of leg 24 is sufficient to pull it down into its bracing position. The various parts of apparatus 10 are preferably made of case-hardened steel and stainless steel Apparatus 10 is preferably painted bright colors which glow in the dark to deter potential vehicle thieves before they break into the vehicle.

Second Preferred Embodiment

Figure 11:
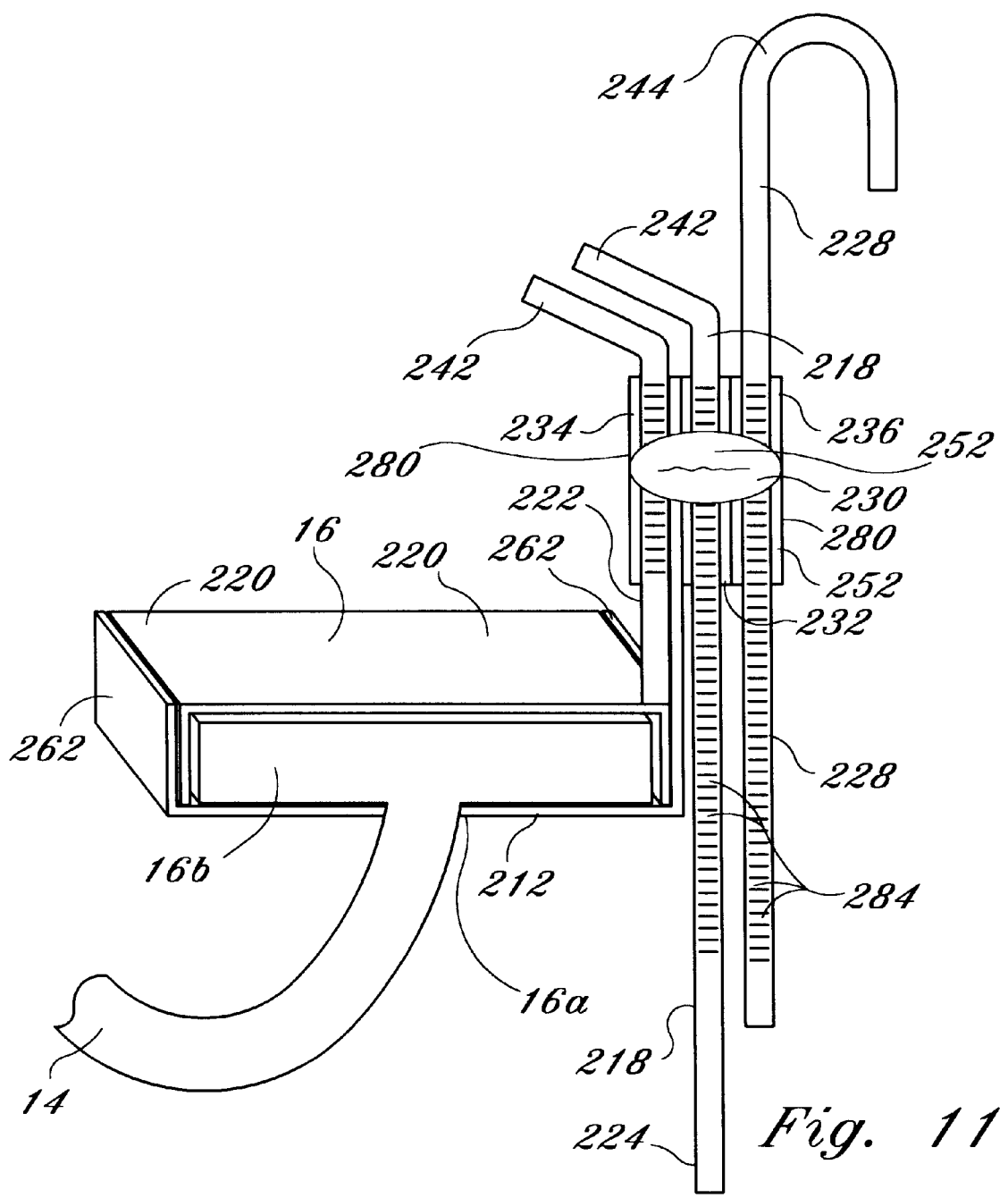
FIG. 11 is a perspective side view of the second embodiment of the apparatus, shown with a brake pedal and broken away brake lever secured within the apparatus cradle and enclosing member. The apparatus lock mechanism is represented schematically with an oval mark.

The second embodiment is similar to the first except that the leg 224 extends from the brake pedal 16 toward the fire wall portion 202 of vehicle floor 22, the cradle 212 wraps around the back face and sides of pedal 16, and a slidable pedal enclosing member 220 is also preferably connected to cradle 212. See FIGS. 11 and 12. Enclosing member 220 slides against the front face of the brake pedal 16 while pedal 16 is retained within cradle 212 to secure pedal 16 against removal from cradle 212. Once again, as in the first embodiment leg 224 is extended to the vehicle floor 22 to brace the apparatus 10 and thereby prevent brake pedal 16 depression.

Leg 224 is a segment of a leg guide rod 218 which slides within a leg guide tube 232. Leg 224 optionally has a foot 226 secured to its floor abutting end. Enclosing member 220 is a segment of channel stock mounted substantially perpendicularly on an enclosing member guide rod 222 which is slidably retained within an enclosing member guide tube 234. Leg guide rod 218 and enclosing member guide rod 222 each include a longitudinal series of locking notches 284 and each extends out of guide tubes 232 and 234, respectively, toward the user and preferably terminates in bent handle portions 242. An optional additional feature is a steering wheel 238 locking hook segment 244 formed on the end of a hook guide rod 228 which is slidably retained within a hook guide tube 236.

Figures 12, 12A:
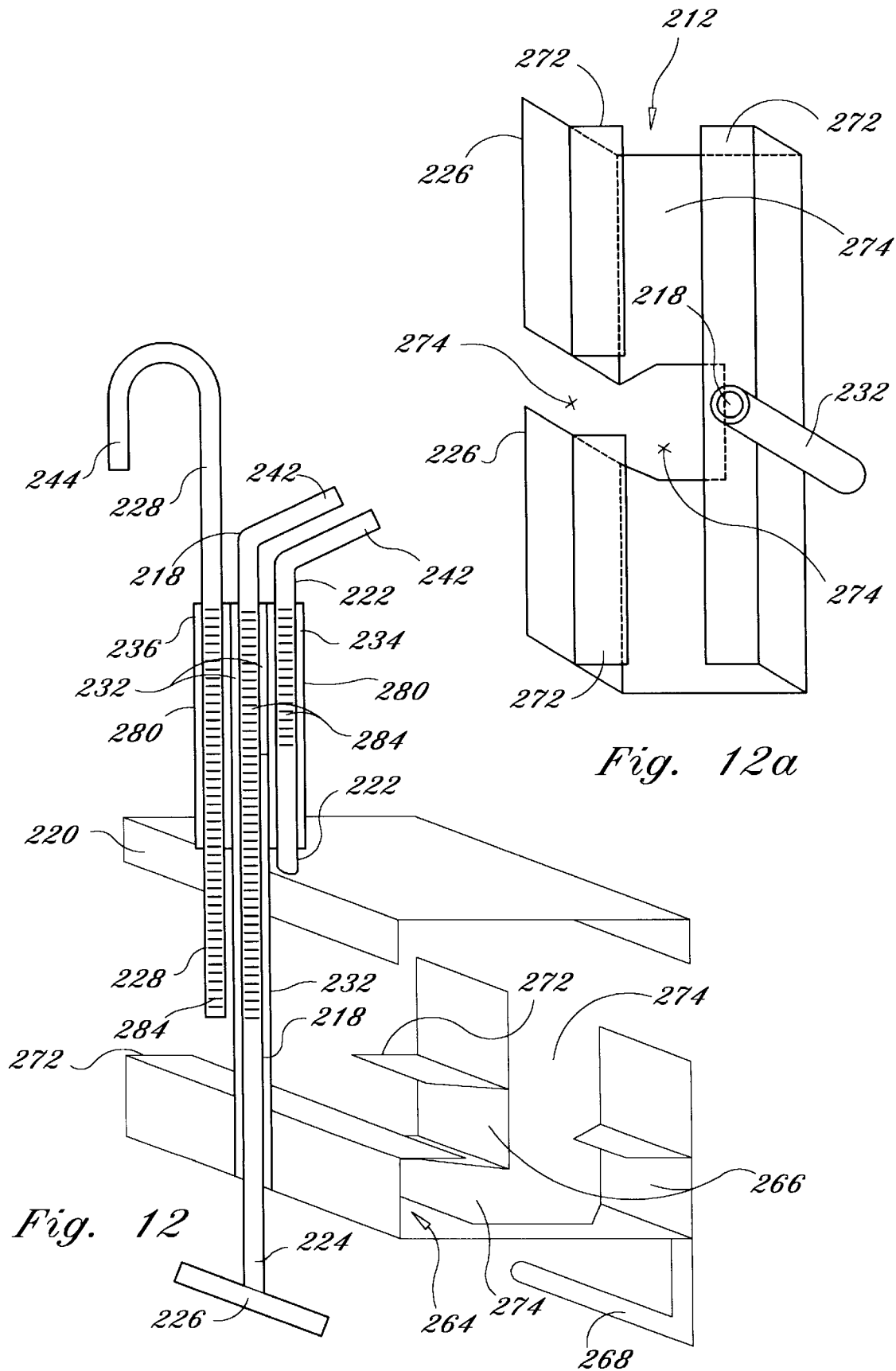
FIG. 12 is a view as in FIG. 11 except that optional horizontal cradle side walls are added, as well as the optional brake lever abutment bar. The lock mechanism is omitted from the FIGURE for clarity.
FIG. 12a is a perspective top view of one preferred version of the cradle.
Figure 13:
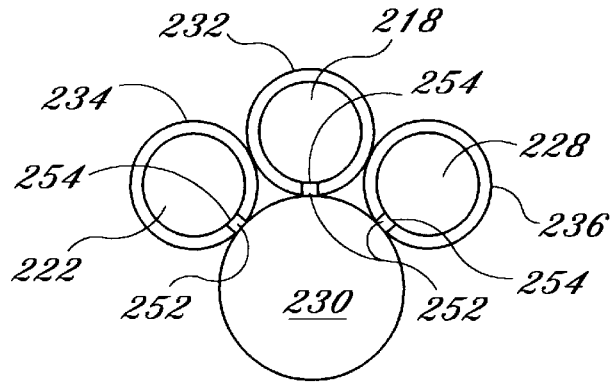
FIGS. 13 and 14 are cross-sectional views of the apparatus guide body showing two possible guide tube configurations and also showing the lock bolts entering ports in the guide tubes to engage notches in the guide rods.
Figure 14:
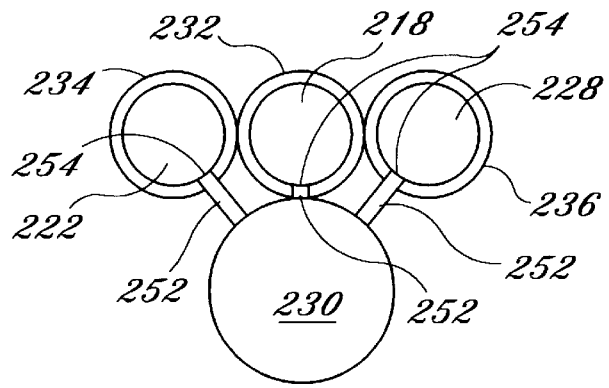

Guide tubes 232–236 are mutually parallel, laterally abutting and fastened together such as by welding, and may be configured in a co-planar row as illustrated in FIGS. 11, 12, 14 and 17, or in an arc as in FIG. 13, or in a triangular arrangement so that each guide tube laterally connects to the lock mechanism 230. Interconnected guide tubes 232–236 together constitute the apparatus guide body 280. Cradle 212, which is preferably a segment of channel stock as well, is welded or otherwise fastened to guide body 280 to extend substantially perpendicularly from guide body 280.

Figure 15:
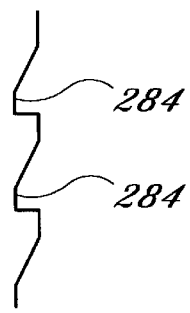
FIG. 15 is a preferred profile of sequential notches in a guide rod for engagement by a lock bolt.
Figure 16:
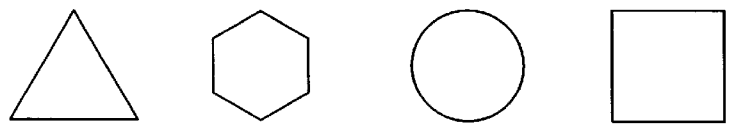
FIG. 16 is a series of guide rod end views showing several preferred guide rod cross-sectional shapes

Lock mechanism 230 is of generally conventional construction except that it has an engaging bolt or bolts 252 which simultaneously engage immediately adjacent locking notches 284 in the two or three guide rods 218, 222 and 228. Bolts 252 retractably slide radially through guide tube bolt openings 254 and into notches 284. See FIGS. 13 and 14. Lock mechanism 230 thereby releasably secures the guide rods against longitudinal movement within guide tubes 232–236. Bolts 252 are extended and retracted in the same general manner as other bolts and with the same general mechanism on other locks with the use of a key or equivalent element. The preferred notches 284 produce one-way free sliding when locking mechanism 230 is engaged and locking against movement the opposite way. See notch 284 illustration in FIG. 15. Rods 218, 222 and 228 and their corresponding guide tubes 232, 234 and 236, may have any of several cross-sectional shapes, some preferred ones being illustrated in FIG. 16. Non-circular shapes have the structural advantage of preventing rotation of the given rod within its guide tube.

To use apparatus 10, guide body 280 is maneuvered to fit cradle 212 around the back 16a and side faces 16b of brake pedal 16. Then leg guide rod 218 is slid within leg guide tube 232 toward the vehicle floor 22 to advance leg 224 into abutment with floor 22. Enclosing member guide rod 222 is slid within enclosing member guide tube 234 toward the brake pedal 16 until enclosing member 220 is either in contact with or sufficiently close to brake pedal 16 to prevent removal of brake pedal 16 from cradle 212.

The side walls 262 of cradle 212 preferably extend from upright cradle 212 side edges around pedal 16, and have brake lever passing openings 264 to pass certain laterally extending brake levers found on various vehicles. Two additional, generally horizontal side walls 266 are optionally provided so that cradle 212 essentially becomes an open-top box for receiving brake pedal 16. A brake lever abutment bar 268 is optionally provided as illustrated in FIG. 12 for added brake control securing and engagement.

To accommodate the wide variety of brake pedal 16 and brake lever 14 configurations found on existing vehicles, an enhanced version of cradle 212 is optionally provided. See FIGS. 17 and 18. Cradle 212 is formed from a segment of channel stock which is deeper than brake pedal 16 is thick. Brake pedal abutment flanges 272 extend toward each other from midpoints of opposing channel side walls 262 and define between them a brake lever 14 passing gap 274. Flanges 272 can also extend from opposing side walls 266, as shown in FIGS. 12 and 12a. Also as shown in these FIGURES, lever passing gap 274 can extend through several cradle 212 surfaces as desired. This cradle 212 configuration stabilizes brake pedal 16 by causing pedal 16 to rest flat against flanges 272, while the brake lever 14 extends through flanges 272 and out of cradle 212, regardless of the direction lever 14 happens to extend from pedal 16

Cradle 212 alternatively or additionally engages brake lever 14, and alternatively engages a clutch or clutch lever. Thus the term "brake control" will be used to refer to the brake lever 14 and pedal 16 combination or to either one separately.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

PARTS LIST

10. Apparatus
12. Cradle
14. Brake lever
16. Brake pedal 16a. Pedal back face 16b. Pedal side faces
20. Bracing portion
22. Vehicle floor
24. Leg
26. Foot
30. Lock mechanism
40. Channel structure
42. and 44. Channel structure side walls
46. Bottom
50. Brake lever retaining projection
52. The free end of the retaining structure 50
66. Vehicle fire wall
70. Wedge-shaped channel wall extension
72. Tapering extension side walls
74. Extension end wall
82. Leg sheath
84. Leg notches
94. Notch upper ends
96. Notch lower ends
102. Apparatus guide flange PARTS LIST (Page 2)

108. Accelerator pedal
110. Accelerator cover plate
112. Cover plate sheath
114. Forward sheath wall
116. Rearward sheath wall
118. Perimetrical sheath wall
122. Screw bores
124. Adjustment track
126. Set screw receiving holes
132. Set screw
142. Fanning structure
144. and 146. Guide walls of fanning structure
148. Fanning plate
152. Fanning structure pin
154. Threaded set screw bore
156. Set screw
158. Set screw receiving holes
162. Track for fanning structure
170. Finger pull ring
172. Foot engaging tab
180. User gripping handle
182. Set pin
184. Sliding handle rod
186. Bent handle portion
188. Handle outer sleeve for slidably retaining handle rod PARTS LIST (Page 3)

190. Pin retaining chain
284. Locking notches on rods
202. Floor fire wall portion
212. Cradle
218. Leg guide rod
220. Enclosing member
222. Enclosing member guide rod
224. Leg
226. Foot on end of leg
228. Hook guide rod
230. Lock mechanism
232. Leg guide tube
234. Enclosing member guide tube
236. Hook guide tube
238. Steering wheel
242. Handle portions of rods
244. Locking hook segment
252. Lock bolt(s)
254. Bolt openings in tubes
262. Cradle side walls
264. Openings in cradle side walls for brake lever
266. Cradle horizontal side walls
268. Abutment bar
272. Cradle—brake pedal abutment flanges
274. Brake lever passing gap between internal cradle flanges
280. Apparatus guide body

I claim as my invention:

1. An anti-theft apparatus for a vehicle having a vehicle floor, an accelerator pedal, and a pivoting brake control including a brake pedal mounted on a downwardly extending brake lever, comprising:

engaging means for mechanically engaging said pivoting brake control;

bracing means connected to said engaging means having a leg of fixed length which is directed toward the vehicle floor to prevent said brake control from pivoting substantially;

and an abutting member fixed to an abutting member guide rod longitudinally slidably retained within an abutting member guide tube; a guide body including said abutting member guide tube laterally connected to a guide tube which slidably receives said bracing means;

locking means for locking said abutting member against movement relative to said abutting member guide tube;

wherein said abutting member is slidably extendable toward the brake pedal and said engaging means while the pedal is retained within said engaging means to secure the pedal against removal from said engaging means.

2. An anti-theft apparatus for a vehicle having a vehicle floor, an accelerator pedal, and a pivoting brake control including a brake pedal mounted on a downwardly extending brake lever, comprising:

engaging means for mechanically engaging said pivoting brake control;

bracing means connected to said engaging means having a leg which is extensible to the vehicle floor to prevent said brake control from pivoting substantially, and is retractable from the vehicle floor to permit pivoting of said brake pedal, said leg being functionally separate from and slidable relative to said engaging means;

locking means for releasibly securing said leg against movement relative to said engaging means when said leg is extended;

a leg guide tube surrounding said leg;

and an abutting member attached to an abutting member guide rod slidably retained within an abutting member guide tube connected to said leg guide tube and lockable against movement relative to said abutting member guide tube with said locking means;

wherein said abutting member is slidably extendable toward the brake pedal and said engaging means while the pedal is retained within said engaging means to secure the pedal against removal from said engaging means.

3. An anti-theft apparatus for a vehicle having a vehicle floor, an accelerator pedal, and a pivoting brake control including a brake pedal mounted on a downwardly extending brake lever, comprising:

engaging means for mechanically engaging said pivoting brake control;

bracing means connected to said engaging means having a leg which is extensible to the vehicle floor to prevent said brake control from pivoting substantially, and is retractable from the vehicle floor to permit pivoting of said brake pedal, said leg being functionally separate from and slidable relative to said engaging means; and locking means for releasibly securing said leg against movement relative to said engaging means when said leg is extended, wherein said engaging means comprises a cradle for retaining said brake pedal, a leg guide tube surrounding said leg, and an enclosing member attached to an enclosing member guide rod slidably retained within an enclosing member guide tube connected to said leg guide tube and lockable against movement relative to said enclosing member guide tube with said locking means;

wherein said enclosing member is slidably extendable toward the brake pedal while the pedal is retained within said cradle to secure the pedal against removal from said cradle.

4. An apparatus according to claim 3, wherein said leg is a segment of a leg guide rod slidably retained within said leg guide tube.

5. An apparatus according to claim 4, wherein said leg guide rod and said enclosing member guide rod both extend a certain distance out of said guide tubes away from said vehicle floor and terminate in handle portions for gripping by a user to slide said leg guide rod and enclosing member guide rod within said guide tubes to engage and disengage said apparatus from said pivoting brake control.

6. An apparatus according to claim 4, additionally comprising:

a hook guide rod having a steering wheel engaging hook segment formed on an engaging end of said hook guide rod, and a hook guide tube connected to said leg and enclosing member guide tubes, wherein said hook guide rod is slidably retained within said hook guide tube.

7. An apparatus according to claim 6, wherein said leg guide rod and said enclosing member guide rod each have a longitudinal series of locking notches.

8. An apparatus according to claim 7, wherein said locking means comprises a bolt port in each of said leg and enclosing member and hook guide tubes, and retractable bolt means extensible into each of said bolt ports to engage an immediately adjacent locking notch in each of said leg, enclosing member and hook guide rods, and thereby lock said rods against substantial longitudinal movement relative to said guide tubes, and lock mechanism and key means for extending and retracting said bolt means.

9. An apparatus according to claim 8, wherein the brake pedal has a back face and side faces, and wherein said cradle wraps around the back face and side faces of said brake pedal;

wherein said enclosing member is a segment of channel stock mounted substantially perpendicularly on said enclosing member guide rod and defining channel stock side walls, wherein said guide tubes constitute an apparatus guide body, wherein said cradle is a segment of channel stock fastened to said guide body to extend substantially perpendicularly from said guide body, wherein channel stock cradle side walls of said cradle are positioned along upright cradle side edges, and have brake lever passing gaps to pass laterally extending brake levers.

10. An apparatus according to claim 3, wherein the brake pedal has a back face and side faces, and wherein said cradle wraps around the back face and side faces of said brake pedal.

11. An apparatus according to claim 3, wherein said enclosing member is a segment of channel stock mounted substantially perpendicularly on said enclosing member guide rod.

12. An apparatus according to claim 3, wherein said cradle comprises:

a segment of channel stock which is deeper than the brake pedal is thick, said channel stock comprising channel side walls and an interconnecting wall in the form of a channel web extending between said channel side walls, brake pedal abutment flanges extending toward each other from opposing said channel side walls and defining between them a brake lever passing gap and being spaced apart from said channel web, such that said abutment flanges stabilize the brake pedal by making substantially flat abutment against said pedal, while the brake lever extends through said gap and out of said cradle, to accommodate a wide variety of brake pedal and brake lever configurations.

13. An apparatus according to claim 3, wherein said engaging means engages the brake pedal.

14. An apparatus according to claim 3, wherein said vehicle comprises a pivoting clutch control including a clutch pedal mounted on a downwardly extending clutch lever, wherein said engaging means engages said pivoting clutch control.

15. An apparatus according to claim 13, wherein said cradle comprises means for retaining said brake pedal against substantial lateral and downward movement relative to said cradle.

16. An apparatus according to claim 15, wherein said cradle comprises a channel structure having two substantially parallel and mutually opposing channel structure side walls and a channel structure bottom wall interconnecting said channel structure side walls and channel structure first and second ends, said channel structure side walls being spaced apart a distance to receive between them said brake lever.

17. An apparatus according to claim 15, wherein said leg has a corresponding sized and proportioned substantially rectangular cross-section and a longitudinal edge, and wherein said leg includes a series of notches recessed along said longitudinal edge.

18. An apparatus according to claim 17, wherein said locking means comprises a key operated lock structure having a locking bolt for sliding into any immediately adjacent said leg notch to lock said leg against retraction into said leg guide tube until said locking bolt is moved and said adjacent leg notch released by inserting a key into and operating said lock structure.

* * * * *